United States Patent

Linzer

[15] 3,665,730
[45] May 30, 1972

[54] APPARATUS FOR SIMULTANEOUSLY SUPPORTING, COOLING AND SHAPING GLASS SHEET AND THE LIKE

[72] Inventor: Frederick D. Linzer, 1373 Foxwood Drive, Monroeville, Pa. 15146

[22] Filed: June 11, 1970

[21] Appl. No.: 45,308

[52] U.S. Cl. ..................65/182 A, 65/104, 65/107, 65/119, 65/114
[51] Int. Cl. ......................................C03b 27/00
[58] Field of Search..............65/25 A, 182 A, 104, 107, 119, 65/114

[56] References Cited

UNITED STATES PATENTS 3,223,500  12/1965  Misson .....................65/182 A X
3,293,015  12/1966  Fredley et al. .................65/104 X Primary Examiner—Arthur D. Kellogg
Attorney—Buell, Blenko & Ziesenheim

[57] ABSTRACT

Apparatus for simultaneously supporting, cooling and shaping glass sheet and the like having heat transfer beds positioned beneath the glass sheet so that the glass sheets are supported by a gas flow through the heat transfer beds. Each heat transfer bed has manifolds for conveying a gas flow from a source to a parallel array of elongated members extending substantially transverse to the direction of travel of the glass sheet, and through cavities in said elongated members to be discharged through orifices along the length of the elongated member against the lower surface of said sheets to substantially uniformly support said sheets while cooling them. Said elongated bar members can also be contoured so that the glass sheet is gradually shaped to a desired curved shape as it is transported and cooled.

15 Claims, 5 Drawing Figures

Patented May 30, 1972 3,665,730

INVENTOR
Frederick D. Linzer

INVENTOR
Frederick D. Linzer

Patented May 30, 1972

INVENTOR
Frederick D. Linzer

APPARATUS FOR SIMULTANEOUSLY SUPPORTING, COOLING AND SHAPING GLASS SHEET AND THE LIKE

This invention relates to an apparatus for simultaneously supporting, cooling and shaping glass sheets and the like. It is particularly useful in providing a relatively inexpensive, easily adaptable and low maintenance means of tempering glass sheets as they emerge from a furnace.

The manufacture of glass sheets is broadly old and well-known. It involves the bending, tempering, annealing and/or coating of glass sheets by heating them to a temperature at which they will deform by the force of their own weight if unsupported. Tempering involves in addition the rapid cooling of the glass sheets from such deformation temperatures to temperatures at which a stress pattern is permanently established in the sheets. The stress created in the glass sheets during tempering and other processing frequently causes the glass sheets to shatter during such operations. In any case, the manufacture of glass sheets involves the cooling and shaping of glass sheets and the transporting thereof both while hot and while cold. Such supporting apparatus has heretofore resulted in undesirable deformation and marring of the surfaces of the glass sheets due to physical contact between supporting and conveying apparatus and the glass sheets, and in turn impairment of the glass processing line as a whole.

It has been proposed heretofore to support the glass sheets and at the same time cooling and shaping the glass sheets by supporting the glass sheet, either in whole or in part, on a film of gas. The film of gas supports the glass sheet substantially uniformly against undesired contact with the bed beneath and undesired surface marring and deformation. Such a proposal is shown in Misson U.S. Pat. No. 3,223,500. Such apparatus required individual modules to be positioned uniformly under the glass sheet. But such individual modules were complex and expensive to fabricate, and the entire supporting bed assembly must be changed where different curved forms of glass sheet were to be made on the same production line. Each different curved shape for glass sheet required the disassembling of the whole supporting bed and reassembling it with a different plenum and module assembly. In addition, such apparatus had to be constantly monitored and cleaned; otherwise it would fill-up and clog with broken glass from shattered sheets which fell into the various small cavities between the modules.

The present invention overcomes these difficulties and disadvantages, and provides a simply maintainable apparatus for simultaneously supporting, cooling and shaping that will not clog regardless of the number of glass sheets that shatter during processing. In addition it is relatively inexpensive to build and to install, and it can be changed and realigned as required in a short time with relatively little labor.

I provide an apparatus for simultaneously supporting, cooling and shaping of glass sheets and the like. A plurality of heat transfer beds are positioned below the glass sheets as they move through the cooling zone. Heat transfer means (preferably similar to said heat transfer beds) are positioned above the glass sheets opposite said heat transfer beds. And driving means are provided for transporting said glass sheets.

Each heat transfer bed positioned beneath the glass sheets is comprised of at least one manifold for conveying a gas flow from a source, such as a pumping means, to elongated bar members. Each elongated bar member extends substantially transverse to the direction of travel of the glass sheets and is substantially parallel to like elongated bar members to form a parallel, spaced array. Each elongated bar member is fastened to a manifold or manifolds to receive a gas flow, and has at least one cavity therein for conveying said gas flow from said manifold or manifolds. Each elongated bar member also has a plurality of orifices along its length capable of discharging said gas flow from said elongated bar member and against lower surfaces of said glass sheets to substantially uniformly support said glass sheets and at the same time rapidly cool and possibly aid in shaping said glass sheets.

The manifolds serve two purposes. They support and position the elongated bar members, and supply the coolant to the elongated bar members in an efficient way. The elongated bar members are fastened to the manifolds by simple gas-tight mechanical connections and possible expansion joints. Design and construction of such joints are well-known in the art. Fluid dynamic considerations for minimizing transmission pressure losses should dictate the precise geometry of the manifolds and elongated bar members and their relation to each other. Further, it may require supplementary cooling gas intakes to the manifold. In any case, these considerations are matters of design well-known to the art.

I prefer that each lower heat transfer bed have a single manifold or a simple geometric shape such as a rectangular or other polyangular shape. The elongated bar members can hence extend from one portion of said manifold to another portion. In addition, the elongated bar members may extend substantially perpendicular to the direction of travel of the glass sheet, but preferably extend oblique to the direction of travel of the glass sheets to aid in uniformly cooling and transporting the glass sheet through the cooling zone. I prefer that each elongated bar member not be positioned precisely perpendicular to the direction of travel of the glass sheets because the resulting possible alignment of the orifices will cause local irregularities in cooling of the body of the glass sheet and irregularities in the surface of glass sheets. Alternatively, the elongated bar members can be positioned precisely perpendicular to the direction of travel of the glass sheet and the orifices can be positioned along the elongated bar members so that they are not in axial alignment.

The elongated bar members are preferably of relatively inexpensive construction. Split tubing may be used to form wall portions and planar, thickened orifice portions (of various design) fastened into the split tubing to form the completed elongated bar member with the cavity through which the coolant gas flow is conveyed to the lower surface of the glass sheet.

I also prefer that the elongated bar members be easily removable from the manifold or manifolds. In this way, the shape of the heat transfer bed can be changed from one configuration to another simply by changing the elongated bar members. The rest of the structure remains the same. Thus the shape of the heat transfer bed can be conformed to the contour of glass sheets which have curvilinear surfaces rather than a rectilinear surface by simply changing the elongated bar members.

Additionally, I prefer that the heat transfer beds are slightly tilted to one side of the direction of travel of the glass sheets, and the driving means are positioned to said side of said lower heat transfer beds to which said heat transfer beds are tilted. In this way, the driving means is needed on only one side of the direction of travel of the glass sheets and can double as an indexing means.

Other details, objects and advantages of my invention will become apparent as the following description of the presently preferred embodiments proceeds.

In the accompanying drawings I illustrate presently preferred embodiments of my invention in which.

Referring specifically to the drawings, an apparatus for simultaneously cooling and supporting glass sheets is provided with an upper heat transfer bed 10 and a lower heat transfer bed 11. The apparatus is positioned to receive glass sheets 12 from furnace 13, to support and to transport said glass sheets along as they are being cooled, and to discharge them for further processing at 14.

Figure 1:
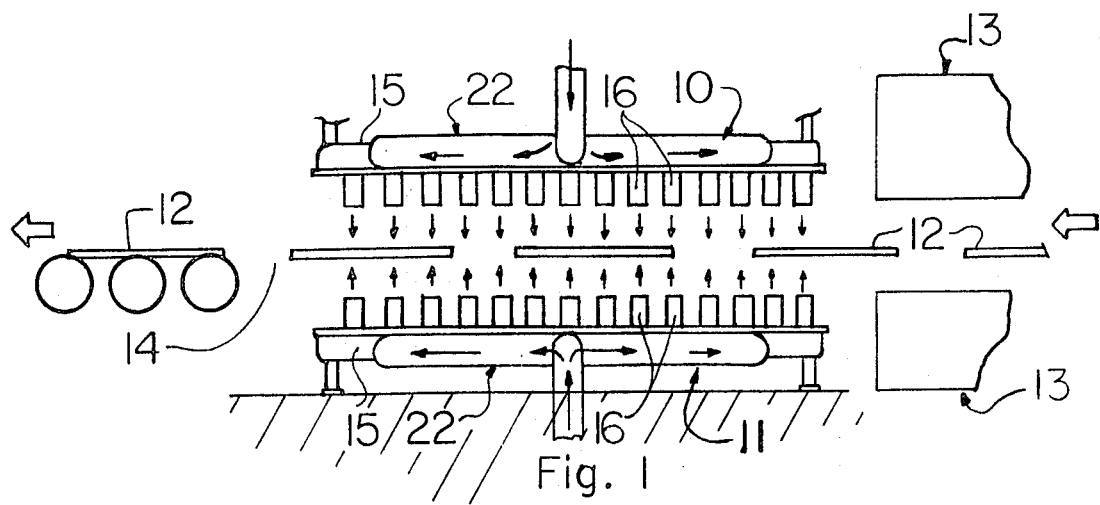
FIG. 1 is a side elevation schematic view of an apparatus for simultaneously cooling and supporting glass sheet positioned in a manufacturing line.
Figure 2:
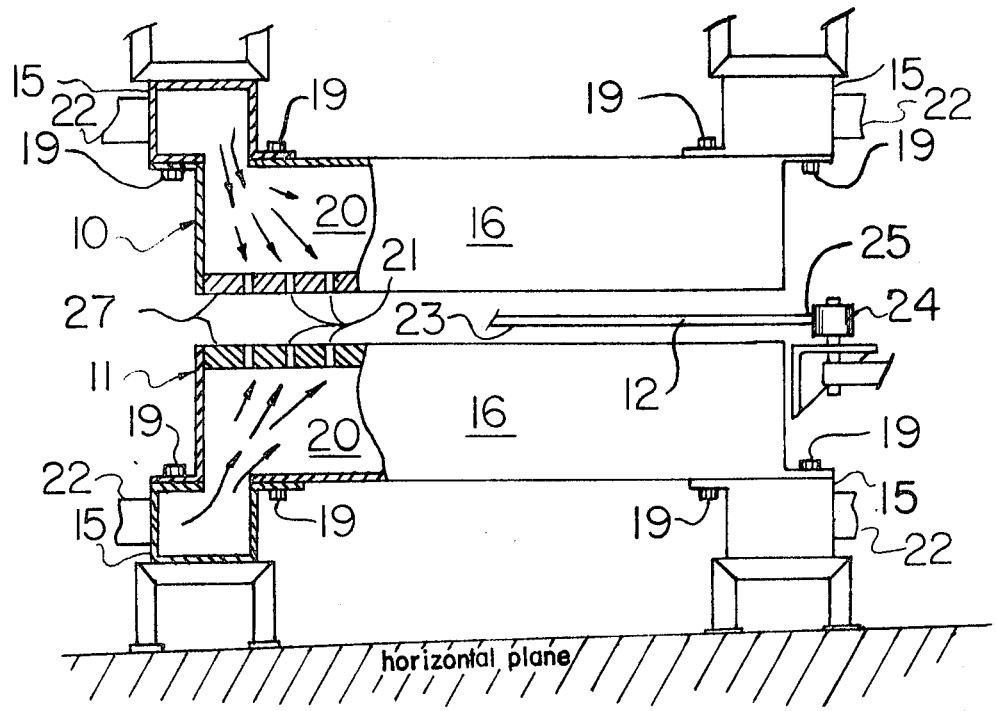
FIG. 2 is an end view with portions broken away of an apparatus for simultaneously cooling and supporting glass sheet.
Figure 3:
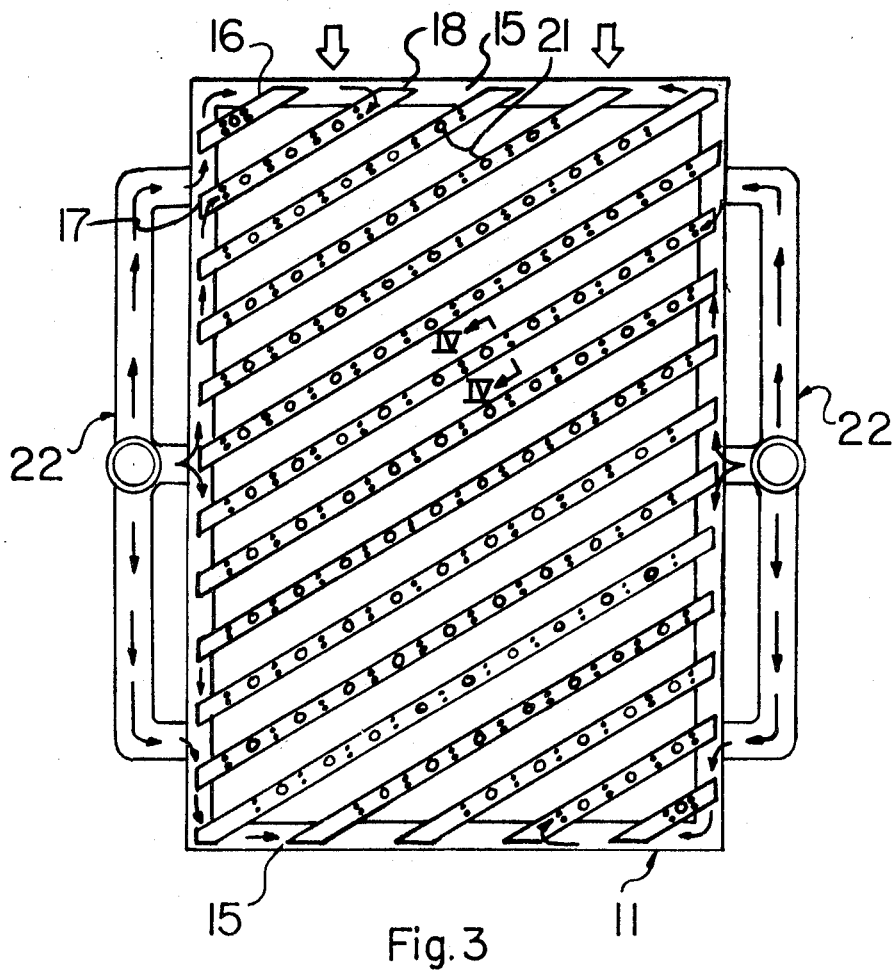
FIG. 3 is a top view of a heat transfer bed for an apparatus for simultaneously cooling and supporting glass sheet.

Lower heat transfer bed 11 is comprised of a rectangular peripheral or annular type manifold 15 as shown in bottom section in FIG. 2 and a plurality of elongated bar members extending transverse to the direction of travel of the glass sheets 12. Each of the elongated bar members 16 extends, for example, from one portion 17 of said manifold 15 to another portion 18 of said manifold 15 over the open center of manifold 15 whereby the broken glass may fall between bar members 16 through the open center of manifold 15 and is substantially parallel to and spaced from the other elongated bar members 16. Each elongated bar member 16 is fastened to said manifold 15 by bolts 19 or other suitable means so that it is easily removable yet can receive a glass flow from manifold 15. Each elongated bar member 16, in addition, has a cavity 20 for conveying a gas flow received from said manifold 15 to orifices 21 along its length for discharging said gas flow.

In operation, the manifold 15 receives a cool gas flow from a source (not shown) through intakes 22 and distributes it to the elongated bar members 16. Each elongated bar member 16 receives an appropriate portion of the gas flow from the manifold 15 and conveys it through cavity 20 to the orifices 21. The orifices 21 in turn direct the gas flow against portions of the bottom surface 23 of the glass sheets 12 to substantially uniformly support said glass sheets 12, and at the amme time, to rapidly cool the glass sheets 12 from the viscous state they are in as they leave the furnace 13. To achieve substantially uniform support for the glass sheets 12, the gas flow from the source is so distributed, throttled and diffused by the manifolds 15, the elongated bar members 16, and the orifices 21, that the various localized jets of pressure against the lower surfaces 23 of the glass sheets 12 are substantially equal, and in turn the pressures against the lower surfaces 23 of the glass sheets provide a substantially uniform support for the glass sheets 12 under normal operating condition. To achieve this result, I prefer that the orifices 21 act as the primary throttle and that the cavities 20 act as plenum. I prefer that the rate of gas flow be maintained at such a rate that the average clearance between the glass sheets 12 and the lower heat transfer bed 11 is not less than 0.001 inch and usually not greater than 0.15 inch, though subsequent improvements may allow for greater clearance, especially for glass sheets of thickness of three thirty-seconds inch and less.

To transport the glass sheets 12 through the cooling apparatus, the lower heat transfer bed 11 is tilted to one side of the direction of travel of said glass sheets 12. A driving means comprising a roller 24 or other suitable means, and a motor and gear drive (not shown) is positioned at said side so that roller 24 contacts edge portions 25 of glass sheets 12. The gravitational forces on the glass sheets 12 provide sufficient traction between the edge portions 25 of the glass sheet 12 to index the glass sheet 12 and to transport the glass sheet 12 through the cooling apparatus.

Figure 4:
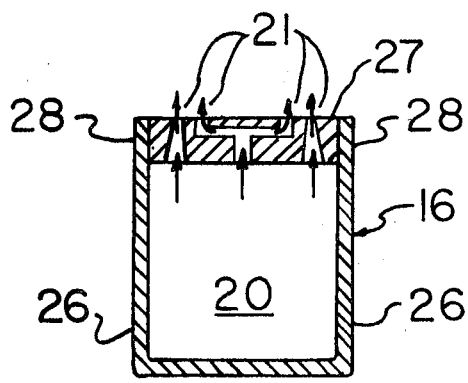
FIG. 4 is a cross-section view of an elongated bar member of a heat transfer bed taken along IV—IV of FIG. 3.

As I prefer, the elongated bar members 16 are of simple construction. As shown in FIG. 4, the wall portions 26 of the bar member 16 are split tubing to which planar orifice portion 27 is welded or brazed at end portions 28. The shape of the orifices 21 in orifices 28 are important but not limiting. I prefer that the orifices 21 be shaped and channeled to throttle the glass flow, and provide a substantially uniform support of turbulent gas against the glass sheets 12 at normal operating pressure.

Figure 5:
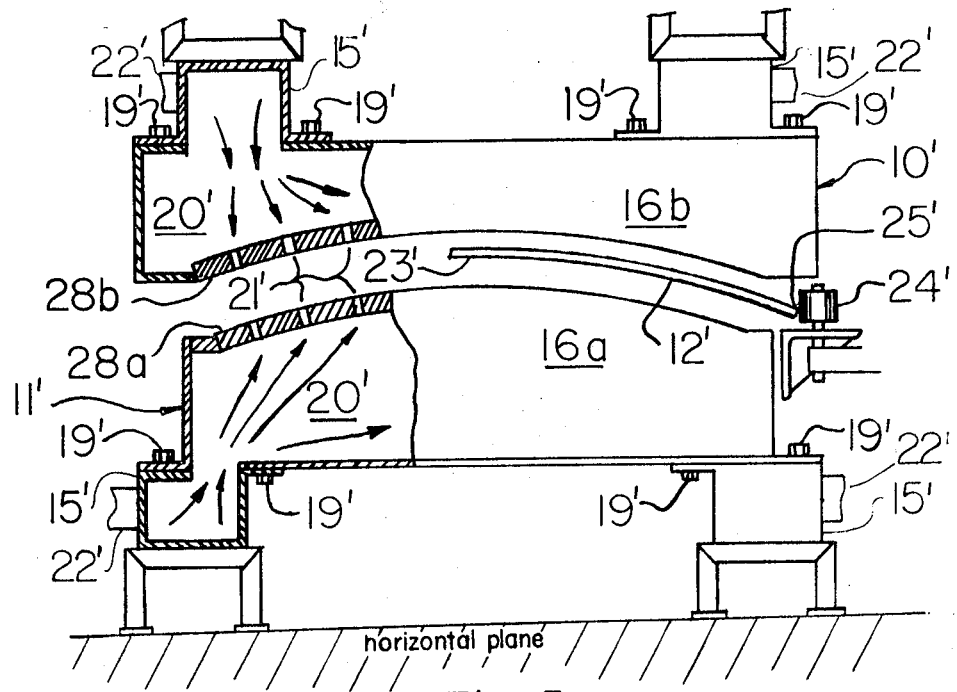
FIG. 5 is an end view with portions broken away of another apparatus for simultaneously cooling, shaping and supporting curved glass sheets.

An alternative cooling apparatus, shown in FIG. 5, is for simultaneously shaping curved glass sheets. The top heat transfer bed 10' and the bottom heat transfer bed 11' are the same as the heat transfer beds hereinbefore described except that the orifice portions 28a and 28b of elongated bar members 16a and 16b have been contoured so that the glass sheets 12' are gradually shaped to a desired curved shape. In use, the manufacturer could change from the elongated bar members 16 of heat transfer beds 10 and 11 to elongated bar members 16a and 16b, respectively, of heat transfer beds 10' and 11' in a short period of time and with little manpower, thereby transforming both heat transfer beds.

While I have illustrated and described certain present preferred embodiments of my invention it is to be understood that I do not limit myself thereto and that my invention may be otherwise variously practiced. I contemplate that my invention may be adapted for other heat transfer and transporting apparatus than cooling and shaping apparatus.

I claim:

1. Apparatus for simultaneously cooling, shaping and supporting glass sheets and the like comprising: at least one heat transfer bed positioned beneath said sheets; each heat transfer bed comprising at least one open center peripheral type manifold for conveying a gas flow from a source to elongated bar members and capable of supporting said elongated bar members, and a plurality of elongated bar members positioned in substantially parallel spaced array, extending substantially transverse to the direction of travel of the sheets and fastened to at least one said manifold to receive a gas flow; each bar member having at least one cavity therein for conveying said gas flow from said manifold and having a plurality of orifices spaced apart along its length capable of discharging said gas flow from said cavity and against lower surfaces of said sheets to substantially uniformly support said sheets; each said bar member functioning as a narrow plenum for said plurality of orifices and being spaced for each adjacent bar member forming a clear passage from each adjacent bar member forming a clear passage for free fall of broken glass particles out of the apparatus between said bar members and through the open center of the manifold; and driving means for transporting said sheets over said heat transfer bed.

2. Apparatus for simultaneously cooling, shaping and supporting glass sheets and the like as claimed in claim 1 wherein: said heat transfer beds positioned beneath said sheets are tilted to one side of the direction of travel of said sheets; and said driving means are positioned to said side of said heat transfer beds to which said beds are tilted.

3. Apparatus for simultaneously cooling, shaping and supporting glass sheets and the like as claimed in claim 1 wherein: each heat transfer bed below said sheet has a single manifold and each elongated bar member extends from one portion of said manifold to another portion of said manifold.

4. Apparatus for simultaneously cooling, shaping and supporting glass sheets and the like as claimed in claim 3 wherein: said elongated bar members are positioned oblique to the direction of travel of said sheets.

5. Apparatus for simultaneously cooling, shaping and supporting glass sheets and the like as claimed in claim 3 wherein: said manifold is of a substantially rectangular configuration.

6. Apparatus for simultaneously cooling, shaping and supporting glass sheets and the like as claimed in claim 1 wherein: said elongated bar members are positioned oblique to the direction of travel of said sheets.

7. Apparatus for simultaneously cooling, shaping and supporting glass sheets and the like as claimed in claim 1 wherein: each heat transfer bed has at least two said manifolds substantially parallel to the direction of travel of said sheets.

8. Apparatus for simultaneously cooling, shaping and supporting glass sheets and the like as claimed in claim 1 wherein in addition: each said elongated bar member has planar and thick orifice portions substantially parallel to surface portions of said sheets and has wall portions of split tubing.

9. Apparatus for simultaneously cooling, shaping and supporting glass sheets and the like as claimed in claim 1 wherein: said elongated bar members are removable from said manifolds.

10. Apparatus for cooling and shaping of glass sheets and the like as claimed in claim 1 wherein: said elongated bar members have orifice portions contoured substantially parallel to surface portions of said sheet.

11. A heat transfer bed for simultaneously cooling, shaping and supporting glass sheets and the like comprising: at least one open center peripheral type manifold for conveying a gas flow from a source to elongated bar members and capable of supporting said elongated bar members, and a plurality of elongated bar members positioned in substantially parallel spaced array, extending laterally from said manifold and fastened to at least one said manifold to receive a gas flow; and each bar member having at least one cavity therein for conveying said gas flow from said manifold and having a plurality of orifices spaced apart along its length capable of discharging said gas flow from said bar member so that said heat transfer bed is capable of substantially uniformly supporting said sheet, each said bar member functioning as a narrow plenum for said plurality of orifices and being spaced for each adjacent bar member forming a clear passage from each adjacent bar member forming a clear passage for free fall of broken glass particles out of the apparatus between said bar members and through the open center of the manifold.

12. A heat transfer bed for simultaneously supporting, cooling and shaping glass sheets and the like as claimed in claim 11 wherein in addition: each said elongated bar member has substantially planar and thick orifice portions and said orifice portions of said elongated bars form a substantially planar heat transfer bed.

13. A heat transfer bed for simultaneously supporting, cooling and shaping glass sheets and the like as claimed in claim 11 wherein in addition: each said elongated bar member has wall portions of split tubing.

14. A heat transfer bed for simultaneously supporting, cooling and shaping glass sheets and the like as claimed in claim 11 wherein: said elongated bar members are removable from said manifolds.

15. A heat transfer bed for simultaneously supporting, cooling and shaping glass sheets and the like as claimed in claim 11 wherein: said elongated bar members have orifice portions contoured to form a curvilinear planar surface.

* * * * *